United States Patent Office 3,553,005
Patented Jan. 5, 1971

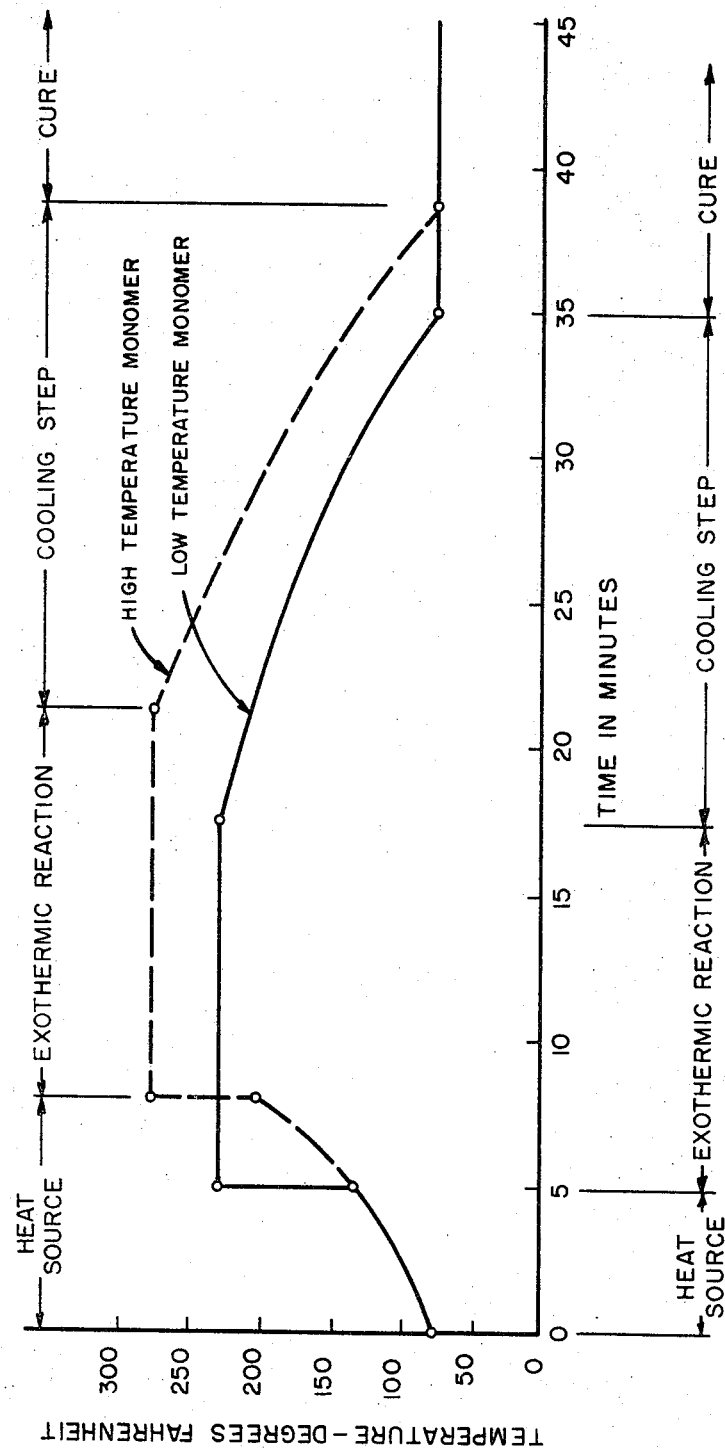

3,553,005
METHOD FOR PRODUCING A PLASTIC IMPREGNATED ARTICLE
Edward L. Moragne, 4723 Nenana,
Houston, Tex. 77025
Continuation-in-part of application Ser. No. 633,048,
Apr. 24, 1967. This application Jan. 25, 1968, Ser.
No. 700,601
Int. Cl. B44d 1/28
U.S. Cl. 117—119
6 Claims

ABSTRACT OF THE DISCLOSURE

Porous material is vacuum impregnated with a treated methyl or ethyl monomer and the impregnated material is thereafter heated by an external heat source to the temperature required to initiate polymerization of the monomer. The external heat source is thereafter removed and the heat generated by the initial polymerization of the monomer is used to complete the polymerization of the remaining monomer. The quality and type of additive employed control the polymerization rate, polymerization temperature, the amount of monomer remaining in the finished product and the time required to cure the polymerized monomer.

CROSS REFERENCE TO RELATED APPLICATIONS

The present invention is a continuation-in-part of application Ser. No. 633,048, entitled "Method and Apparatus for Impregnating Porous Materials," filed Apr. 24, 1967, and invented by the inventor of the present invention, now abandoned.

BACKGROUND OF THE INVENTION (1) Field of the invention

The present invention relates to the field of impregnation of porous material with a chemical which is designed to alter or improve certain of the characteristics of the porous material. In particular, the present invention relates to the vacuum impregnation of a porous material with a monomer and the subsequent polymerization and curing of the monomer in the material.

(2) Description of the prior art

The prior art discloses various means and methods for impregnating porous materials with assorted chemicals. Many of these prior art processes employ a vacuum impregnation technique by an initial drying step and followed by a series of curing or treating steps. Because of the particular chemicals employed in the prior art procedure, the curing or treating of the chemical in the impregnated material usually required the application of heat for an extended period of time. The production speeds of such methods were correspondingly limited because of the prolonged heating step.

To a lesser degree, the production speed has been limited in prior art processes because of the relatively long periods of time required to effect complete impregnation of the porous material with the desired chemical. By way of example, one such prior art method contemplates an impregnation step which may be as long as a day. Still others require the use of superatmospheric pressure after the release of the initial vacuum to effect complete impregnation while another requires that the vacuum and high pressure steps be repeated over several cycles.

In contrast to the problem of inadequate impregnation of the porous material, the prior art processes do not include adequate means for limiting or controlling the amount of impregnating material remaining in the finished product. For this reason, the desired percentage of impregnating chemical remaining in the finished product of the prior art varies over relatively wide ranges.

It is also a prerequisite to certain of the prior art techniques that the porous material be completely dried before it is impregnated. This added step is usually required to insure proper penetration of the impregnating chemical and to prevent subsequent frothing when the impregnated material is heated during a high temperature treating or curing step.

SUMMARY OF THE INVENTION

A methyl or ethyl monomer treated with suitable additives is impregnated in a porous article and thereafter heated by an external heat source to the temperature required to initiate polymerization of a portion of the impregnated monomer. The polymerization reaction of the monomer is exothermic, and once the reaction is initiated in a portion of the impregnated material, it is self sustaining and the external heat source may be removed. The quantity and type of chemical added to the monomer base govern the polymerization temperature of the monomer, the rate of polymerization, the amount of polymerized monomer remaining in the final product and the time required to effect a complete cure of the remaining polymer.

It has also been discovered by the present applicant that the use of an acrylic monomer eliminates the initial drying step required in the prior art in that the monomer appears to be compatable with the presence of relatively large amounts of moisture in the porous material. Moreover, the monomers employed in the present invention have a low viscosity and are readily vacuum impregnated into relatively dense materials without the need for prolonged immersion times or subjection to superatmospheric pressures. As noted hereinbefore, the curing time of the polymerized monomer may also be regulated by the quantity and type of additives mixed with the monomer base. Moreover, the requirement for an additional heating period to cure the polymerized monomer is obviated by the present invention in that the cure is effected at ambient temperatures over a relatively short period of time.

BRIEF DESCRIPTION OF THE DRAWINGS

The single figure of the drawings illustrates the variation of temperature with respect to time for a high temperature monomer mixture and a low temperature monomer mixture as they proceed through the process of the present invention.

DESCRIPTION OF THE PREFERRED FORM OF THE INVENTION

The general process of the present invention requires that the materials to be impregnated be placed in a vacuum chamber where the pressure is reduced to about 10 mm. mercury. An impregnating methyl or ethyl monomer is then drawn from a suitable reservoir into the vacuum chamber by the force of the low pressure within the chamber. The chamber is allowed to fill itself with the monomer to completely immerse the porous material. When the porous material has absorbed the required amount of monomer for the desired treatment, the chamber pressure is allowed to return to atmospheric pressure to drive the monomer into the low pressure pores toward the center of the material.

The excess monomer is drained away and the impregnated material is heated by an external heat source until the polymerization temperature of the impregnating chemical is reached. This temperature is a function of the type and quantity of the additive mixed with the monomer. The external heat is removed and the impregnated material is stored in any suitable location to permit the self-sustaining polymerization reaction to be completed. When the polymerization is completed, the polymer begins to cure to its final state with the rate of cure also being a function of the additives mixed with the monomer.

The drawing illustrates the variation of temperature with time for two samples impregnated with different monomer mixtures. With reference to the single figure of the drawings it may be seen that the low temperature monomer represented by the solid line curve is heated by an external heat source from an initial or ambient temperature of approximately 75 degrees F. to the polymerization temperature of the mixture of 130 degrees F. Once the polymerization temperature of a part of the monomer is reached, which for the low temperature monomer occurs after approximately five minutes of heating, the exothermic reaction brings the temperature of the surrounding monomer to approximately 225 degrees F. The later temperature is sustained until the monomer has completely polymerized at which time the polymerized mixture begins to cool. As illustrated by the curve, the low temperature monomer begins to cool off approximately 12 minutes after the exothermic reaction is initiated. For approximately the next 17 minutes, the polymer cools until it returns to the ambient temperature of approximately 75 degrees F. at which time the polymer begins to cure to its final state.

The high temperature monomer represented by the dashed line curve in the figure begins to polymerize at approximately 275 degrees F. For the high temperature monomer, the external heat source was applied for approximately eight (8) minutes before the polymerization reaction was initiated. The remaining variations of temperature with time for the high temperature monomer is evident from an inspection of the figure.

The following examples will further aid in describing the process of the present invention.

EXAMPLE NUMBER 1

Using a mixture of a methacrylate ester with .02% by weight of benzoyl peroxide as a catalyst and 2% by weight of methacrylic acid, the polymerization reaction start temperature of the mixture was established at 130° F. The porous material was vacuum impregnated with the mixture and thereafter heated to 130° F. by an external heat source. Once the 130° F. temperature was established in a part of the impregnated monomer, the external heat source was turned off and the resulting exothermic reaction brought the temperature of the impregnated material to well over 200° F.

The relationship between temperature and time for the sample is illustrated in the figure by the low temperature monomer curve.

EXAMPLE NUMBER 2

Using a mixture of a methacrylate ester with .04% by weight of benzoyl peroxide and 2% by weight of methacrylate acid and 10 cc. methanol per 100 cc. of the methacrylate ester, the polymerization reaction start temperature was established at 90° F. The porous material was vacuum impregnated with the mixture and thereafter heated by an external heat source to a temperature of 90° F. The external heat source was then removed and the resultant exothermic reaction brought the temperature of the impregnated material to well over 200° F.

The two examples cited above also illustrate the reduction in the reaction temperature of the impregnating mixture which is effected by the addition of methanol. It has also been discovered that the reaction temperature may be adjusted to govern the amount of monomer remaining in the finished product. By way of example, if the reaction temperature is brought up to 250° F., approximately 90% of the monomer will be driven out of the impregnated material; at 200° F., approximately 75% will be lost; at 150° F., approximately 50% will be lost; and at 100° F., approximately 20% of the monomer will boil off. Depending on a desired application, various materials require a different degree of impregnation and from the foregoing, it may be seen that the amount of the monomer mixture remaining in the finished product may be established by the reaction temperature of the mixture which in turn is controlled by the amount and type of additive such as methanol which is combined with the impregnating mixture.

After the completion of the exothermic reaction of the monomer in the impregnated porous material, the polymerized mixture is cured. The curing time is also a function of the polymerization reaction temperature. A material which has been treated at a low temperature requires a longer curing time than a material which has been treated at a high temperature. This is a corollary of the fact that more of the impregnating mixture remains in the product when the mixture has a low polymerization temperature. The curing of the polymerized mixture impregnated in the porous material is effected at ambient temperature over a relatively short period of time.

The following table illustrates the relationship between the percentage by weight of the impregnating mixture remaining in the porous material, the polymerization reaction temperature of the impregnating mixture and the time required to cure the polymerized mixture:

| Percent of treat. | Reaction temperature, °F. | Cure time in hours |
|---|---|---|
| 12.5 | 190 | 1 |
| 25 | 170 | 2 |
| 50 | 140 | 4 |
| 75 | 120 | 6 |
| 100 | 100 | 8 |

The monomer may be converted to a crosslinked monomer by the addition, for example, of ethylene dimethacrylate to a monomer of methyl methacrylate. Similar crosslinking may be effected by appropriate additives for the various monomers. It is preferable to add the crosslinking chemical before the catalyst and reaction temperature control chemicals are added to the monomer. A material impregnated with a crosslinked monomer exhibits improved characteristics in hardness and is appreciably less flexible than material impregnated with a non-crosslinked monomer.

While all types of porous materials may be impregnated by the method of the present invention, the method is particularly significant as it is applied to woods. Various inexpensive and relatively soft woods may be impregnated by the process of the present invention with the material disclosed herein to produce a resultant wood product which exhibits many of the characteristics of more expensive hard woods. Moreover, the impregnated wood is resistant to staining, may be easily machined, is resistant to insect damage and is dimensionally stable. The fiber strength of the wood is increased from 4.5% to 12.5% and the impregnated wood is also fire retardant. The wood may also be colored to imitate any natural wood color merely by adding a suitable dye to the clear monomer.

Although this invention has been described by reference to specific examples, these are meant to be illustrative of the procedures that can be employed and are not to be construed as limitations. Accordingly, the invention is intended to include all the variations and modifications falling with the spirit and scope of the claims. By way of example rather than limitation the catalyst may be selected from the group consisting of the organic peroxides. Also by way of example, ethyl alcohol may be substituted in appropriate solutions for the methanol used in the examples. Similarly, other variations will occur to those having ordinary skill in the art and all such variations come within the scope of the invention.

I claim:
1. A process for impregnating porous material comprising the steps of:
   (a) impregnating the pores of a material with an acrylic monomer;
   (b) heating the impregnating monomer with an external heat source to initiate polymerization of the monomer;
   (c) removing the external heat source after polymerization of the monomer is initiated;
   (d) polymerizing the remainder of the monomer in the pores of the porous material with the heat generated in the exothermic polymerization reaction; and
   (e) curing the impregnated, polymerized monomer.
2. The process defined in claim 1 above wherein said monomer is impregnated into the pores of the porous material by the following steps:
   (a) subjecting the porous material to a first pressure value;
   (b) immersing the porous material in a monomer while the approximate first pressure value is maintained;
   (c) increasing the first pressure value to a higher second pressure value; and
   (d) removing the unimpregnated monomer from the porous article.
3. The method defined in claim 1 wherein the final amount of polymerized monomer remaining in the porous material is controlled by mixing the monomer with a solvent of the type R—OH where R is selected from the class consisting of methyl and ethyl groups before impregnating the porous material.
4. The method defined in claim 2 wherein the final amount of polymerized monomer remaining in the porous material is controlled by mixing the monomer with a solvent of the type R—OH where R is selected from the class consisting of methyl and ethyl groups before impregnating the porous material.
5. The method defined in claim 2 wherein:
   (a) said first pressure value is below atmospheric pressure; and
   (b) said second pressure value is equal to atmospheric pressure.
6. The method defined in claim 4 wherein:
   (a) said first pressure value is below atmospheric pressure; and
   (b) said second pressure value is equal to atmospheric pressure.

References Cited

UNITED STATES PATENTS

| 2,140,981 | 12/1938 | Booty et al. | 117—116UX |
| 3,083,118 | 3/1963 | Bridgeford | 117—148X |
| 2,757,106 | 7/1956 | Brown et al. | 117—161X |
| 3,169,866 | 2/1965 | Lee et al. | 117—161X |

FOREIGN PATENTS

| 539,886 | 4/1957 | Canada | 117—(In situ digest) |

RALPH S. KENDALL, Primary Examiner

U.S. Cl. X.R.

117—59, 61, 119.6, 148, 161